United States Patent [19]
Gatzemeyer et al.

[11] Patent Number: 5,796,914
[45] Date of Patent: Aug. 18, 1998

[54] ELECTRIC FUMIGATION DEVICE

[75] Inventors: John J. Gatzemeyer, Racine; Robert E. Corba; Scott W. Demarest, both of Caledonia; Nicholas M. Gerrits, Whitefish Bay, all of Wis.

[73] Assignee: S. C. Johnson & Son, Inc., Racine, Wis.

[21] Appl. No.: 633,335

[22] Filed: Apr. 17, 1996

[51] Int. Cl.$^6$ .......................... A61M 16/00; A01M 13/00
[52] U.S. Cl. .......................... 392/390; 392/392; 43/125
[58] Field of Search .......................... 392/386, 387, 392/390, 392; 43/125, 129

[56] References Cited

U.S. PATENT DOCUMENTS

| | | |
|---|---|---|
| D. 257,788 | 1/1981 | Suhajda . |
| D. 296,819 | 7/1988 | Suhajda . |
| 2,513,919 | 7/1950 | Costello . |
| 2,690,500 | 9/1954 | Winberg et al. . |
| 2,813,187 | 11/1957 | Rovira . |
| 2,942,090 | 6/1960 | Diehl .......................... 392/392 |
| 3,872,280 | 3/1975 | Van Dalen . |
| 4,037,352 | 7/1977 | Hennart et al. . |
| 4,094,298 | 6/1978 | Kober . |
| 4,095,583 | 6/1978 | Peterson et al. . |
| 4,098,258 | 7/1978 | Kober . |
| 4,106,477 | 8/1978 | Feld . |
| 4,163,038 | 7/1979 | Nishimura et al. . |
| 4,171,340 | 10/1979 | Nishimura et al. . |
| 4,228,124 | 10/1980 | Kashihara et al. .......................... 422/36 |
| 4,251,714 | 2/1981 | Zobele . |
| 4,391,781 | 7/1983 | van Lit . |
| 4,425,302 | 1/1984 | Pons Pons . |
| 4,467,177 | 8/1984 | Zobele .......................... 392/392 |
| 4,627,963 | 12/1986 | Olson . |
| 4,675,504 | 6/1987 | Suhajda . |
| 4,687,904 | 8/1987 | Melanson et al. . |
| 4,703,155 | 10/1987 | Suhajda . |
| 4,725,712 | 2/1988 | Schroeder . |
| 4,745,705 | 5/1988 | Yamamoto et al. . |
| 4,758,708 | 7/1988 | Manchester .......................... 392/390 |
| 4,777,345 | 10/1988 | Manchester .......................... 392/390 |
| 4,780,286 | 10/1988 | Parent . |
| 4,849,181 | 7/1989 | Kelley et al. . |
| 4,938,144 | 7/1990 | Demarest . |
| 4,968,487 | 11/1990 | Yamamoto et al. . |
| 5,095,647 | 3/1992 | Zobele et al. . |
| 5,111,477 | 5/1992 | Muderlak .......................... 392/390 |
| 5,282,334 | 2/1994 | Kimura et al. . |
| 5,402,517 | 3/1995 | Gillett et al. . |
| 5,574,821 | 11/1996 | Babasade .......................... 392/392 |
| 5,647,052 | 7/1997 | Patel et al. .......................... 392/390 |

*Primary Examiner*—Teresa J. Walberg
*Assistant Examiner*—Sam Paik

[57] ABSTRACT

An electrically activatable fumigating device and the method of its use. The device is adapted to be useable with vertically or horizontally oriented, wall-mounted electrical receptacles as well as receptacles mounted in horizontal countertops, all without the need for moving parts in the device. This is accomplished by the relative angle of the electrical plug to the longitudinal axis of a well contained within the body of the fumigating device from the mouth of which active ingredient is expelled by chemical reaction. Use of a modular heating assembly aids in allowing economical manufacture so that the fumigating device may be made inexpensively enough to be a single use device, with a self-disabling, single use, electrically activated heating means.

33 Claims, 6 Drawing Sheets

5,796,914

1

ELECTRIC FUMIGATION DEVICE

TECHNICAL FIELD

This invention relates to devices for fumigating rooms or other similar spaces. In particular, the invention relates to electrically activated, insecticide fumigation devices.

BACKGROUND ART

The art is generally familiar with various means for fumigating an enclosed area, such as a room in a house, by devices that expel a fumigant by means of the sudden application of heat. For example, Nishimura et al., U.S. Pat. No. 4,171,340, produces such heat by exposing to water a substance that hydrates exothermically. The heat thus generated is used to activate a mixture of an active ingredient and a blowing agent to fumigate a room.

Various devices for fumigating, fogging, or dispensing a volatile ingredient into a room are known. Suhajda, U.S. Pat. No. 4,703,155, provides a fog-producing disposable canister that is inserted into an electric fogger. The disposable canister contains a fumigant that is activated by exposure to the heat of a hot plate located within a reusable electric fogger. The whole device is plugged into a wall receptacle via a cord.

Rovira, U.S. Pat. No. 2,813,187, discloses a device for dispersing insecticide powder into a room by means of convection currents generated by the continuous operation of a heating element. This is distinguishable from fumigation, of course, but the Rovira device does provide an example of a dry insecticide-dispersing article designed to be plugged directly into an electrical receptacle. VanDalen, U.S. Pat. No. 3,872,280 is an example of an electrically heated vaporizer that also directly plugs into an electrical receptacle.

Melanson et al., U.S. Pat. No. 4,687,904; Manchester, U.S. Pat. No. 4,777,345; and Parent et al., U.S. Pat. No. 4,780,286, all provide examples of electrically activated fumigation devices that utilize electricity to set off a charge of insecticide to fumigate a room. Each of these devices then automatically disables itself or otherwise shuts itself off.

Thus, the Melanson et al. device uses a positive temperature co-efficient ceramic heater ("PTC heater") to initiate a chemical reaction within a disposable canister. As the insecticide is volatilized, a lead-in wire is fused, interrupting the electrical circuit necessary to power the PTC heater. The fusible lead-in wire is incorporated within the structure of the canister so that the insecticide dispenser may be reused by inserting a new canister with its new charge of insecticide and also with its new fusible lead-in wire.

Manchester also utilizes the fusing of an electrical lead contained within a replaceable canister as a means of disabling or turning off a fumigating device. However, the wire that is fusible within Manchester's canister is itself a resistance heater wire, making unnecessary the use of a separate PTC heater. The device of Parent et al. most resembles that of Melanson et al. in that it depends upon a PTC heater to activate a charge within a disposable canister. However, the heat of the reaction is now made not to fuse a fusible lead-in wire but instead to melt a eutectic metal connector, the loss of which again interrupts the electrical circuit to the PTC heater.

Electrical receptacles are commonly mounted in walls in one or more specific, conventional orientations. Thus, 110 volt electrical receptacles of the sort found in North America tend to be so mounted in a wall that the blades of an electrical plug are located side by side when the electrical plug is plugged into the receptacle. However, it is not uncommon to observe such electrical receptacles mounted at a right angle to the more conventional mounting, so that the blades of an electrical plug plugged into the receptacle are positioned one above the other. In Europe and many other non-North American jurisdictions, comparable alternative conventional wall mounting orientations for electrical receptacles also are very common.

This lack of an invariably standard, single orientation of electrical receptacles presents a problem in the design of any device intended to be directly plugged into a wall-mounted receptacle if the orientation of the device is important to its functioning. Thus, the apparatus of Gillett et al., U.S. Pat. No. 5,402,517, avoids the problem altogether by employing a radially symmetrical design that does not require any given orientation. Zobele et al., U.S. Pat. No. 5,095,647, and Pons Pons, U.S. Pat. No. 4,425,302, disclose devices that must be held upright to work, and both illustrate the use of a pivotable plug that may be twisted with respect to the body of the device. The body may be held in a desired orientation and the blades of the plug simply pivoted to accommodate the orientation of the receptacle to be used.

Costello, U.S. Pat. No. 2,513,919, discloses a vaporizer in which a vapor-emanating tablet or substance is held at an incline to the horizontal to cause rising air currents induced by the action of a heater to pass across or "wipe" the under surface of the tablet, allegedly to achieve a more effective vaporizing or diffusing action. The Costello device is designed to function with the air current passing under the vapor emanating tablet either from right to left or left to right. Consequently, the device works equally well when plugged into a vertically or horizontally installed electrical receptacle so that the Costello device does not require a movable or swivelable plug. The volatile vaporized in Costello simply evaporates within the device and then is carried by relatively gentle connective air currents out of vents in the Costello housing. There is no suggestion of a forceful ejection of material that must be aimed in a particular direction in order to achieve a desirable effect.

The electrically activated fumigators of Melanson et al., U.S. Pat. No. 4,687,904; Manchester, U.S. Pat. No. 4,777,345; and Parent et al., U.S. Pat. No. 4,780,286, discussed above, contemplate the use of replaceable canisters of fumigant so as to allow repeated use of the part of the devices that holds the electrical leads and heater, which typically must be made of relatively expensive, heat-resistant materials. One consequence of this arrangement is that an occasional user, such as a home owner, is forced to fire off the device in a first room, wait for the device to cool, recharge it with fumigant, and then move it for use in a subsequent room. Fumigating an entire house can thus be time consuming and inconvenient. Typically such devices are not so designed that they may be manufactured as economical, single use, throw-away units that a private user can afford to purchase in sufficient numbers that several rooms or even an entire house may be fumigated simultaneously. Besides this inconvenience, the storage of used units and the handling necessary to change canisters presents the possibility of insecticide contamination of a user's hands or the storage area.

The art has yet to adequately address the problem presented by the need for a fumigator device that can accommodate either vertically or horizontally wall-mounted electrical receptacles without the need for moving parts within the fumigating device, where that device is also adapted to direct a forcefully-ejected fumigant upwardly and, preferably, also outwardly away from the wall in which the electrical receptacle is mounted. Furthermore, the art has yet to adequately address the problem of providing a device with such capabilities that can be so economically manufactured that it may be sold as a single-use fumigator at a price that allows a user to purchase one for each room of a house to be fumigated, setting them all off at once to complete the fumigation of multiple rooms efficiently in a single step.

DISCLOSURE OF INVENTION

The electrically activatable fumigating device of the invention is intended for use with electrical receptacles conventionally mounted in generally vertical or upwardly facing surfaces such as, by way of example only, vertical walls or horizontal countertops. The fumigating device includes a body, the body having a well with a well mouth that opens to the atmosphere at one end of the well's longitudinal axis. The well contains a heat-activatable chemical charge that includes an active ingredient and a heat-activated blowing agent means for expelling the active ingredient from the well by a self-sustaining chemical reaction. The well mouth is closed by a cover openable by the blowing agent means to thereby release fumigant at the well mouth.

An electrical plug is also included that is adapted to be plugged into an electrical receptacle. The electrical plug has a transverse axis that extends from side-to-side across the face of an electrical receptacle when the electrical plug is plugged thereinto. The electrical plug is fixedly attached to the body with the longitudinal axis of the well oriented at an angle of about 35° to about 55° to the transverse axis of the electrical plug. By this means, the mouth of the well is directed sidewardly at that angle with respect to any electrical receptacle into which the electrical plug is plugged. Also included is a heating means for heating the heat-activatable chemical charge to initiate the action of the blowing agent means, the heating means being activatable by electricity delivered via the electrical plug.

Alternatively described, the electrically activatable fumigating device of the invention includes a body, the body having a well with a well mouth that opens to the atmosphere at one end of the well's longitudinal axis and that contains a heat-activatable chemical charge including an active ingredient and blowing agent means for expelling the active ingredient from the well by a self-sustaining chemical reaction. The well mouth is closed by a cover openable by the blowing agent means to release fumigant at the well mouth. An electrical plug is included that is adapted to be plugged into an electrical receptacle. The fumigating device of the invention further includes a modular heater assembly formed separately from the body but mounted within the body in fixed relation thereto, the modular heater assembly having a heater platform supporting a heating means for activating the blowing agent means, the heating means being activatable by electricity that is delivered via the electrical plug from the receptacle.

The invention further includes a method of fumigating an area in which an electrical receptacle is mounted by means of the use of the fumigating device as described above, the method including the steps of (1) plugging the fumigating device into the electrical receptacle, so selecting the orientation of the fumigating device that the well mouth opens generally upwardly, and (2) allowing electricity from the electrical receptacle to activate the heating means, first to activate the blowing agent means to release the active ingredient at the well mouth and second to non-renewably self-disable the fumigating device, preventing its subsequent use.

DETAILED DESCRIPTION OF THE PREFERRED EMBODIMENT

Figure 1:
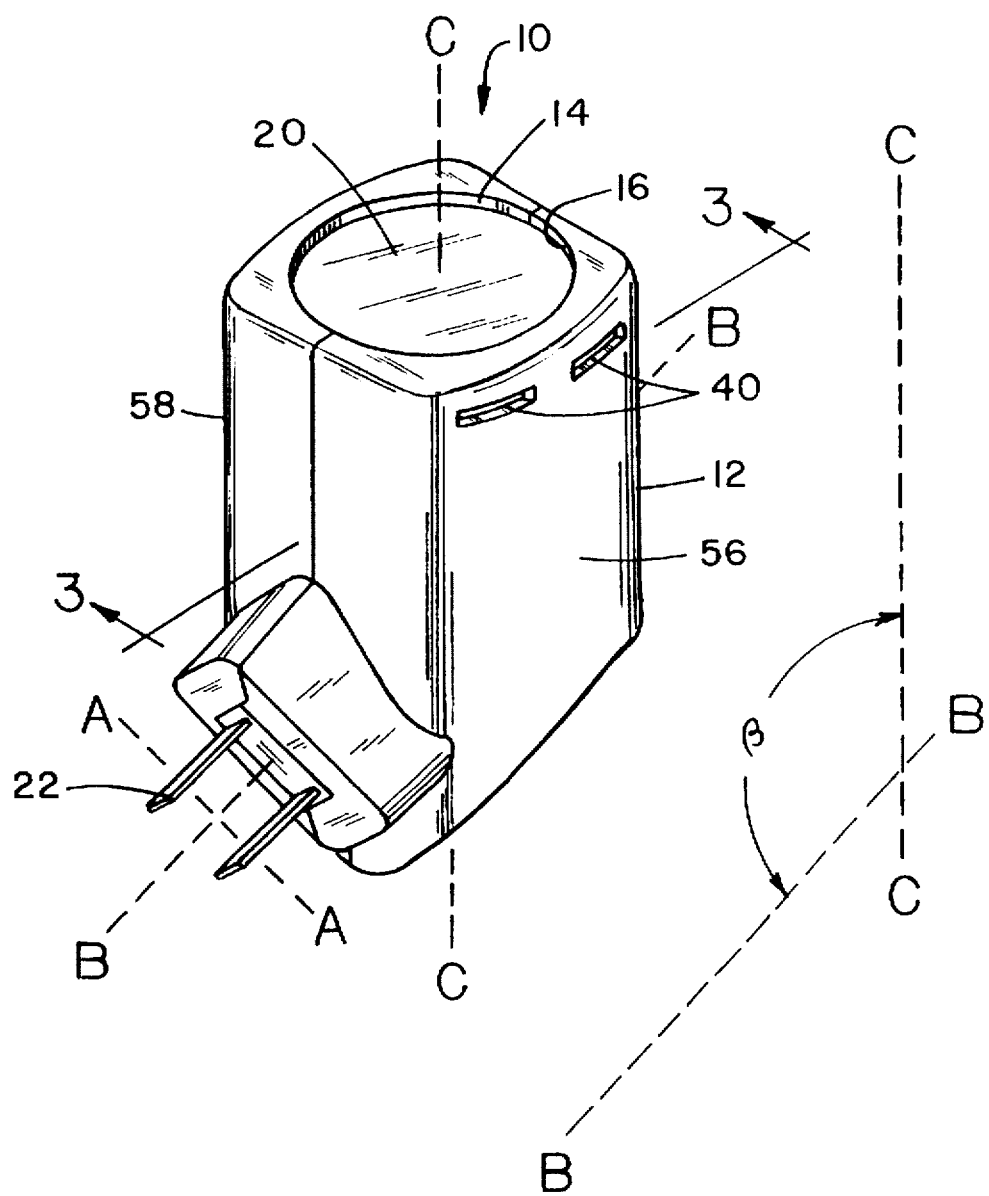
FIG. 1 is a front perspective view of the preferred embodiment of the electric fumigation device of the invention.
Figure 2:
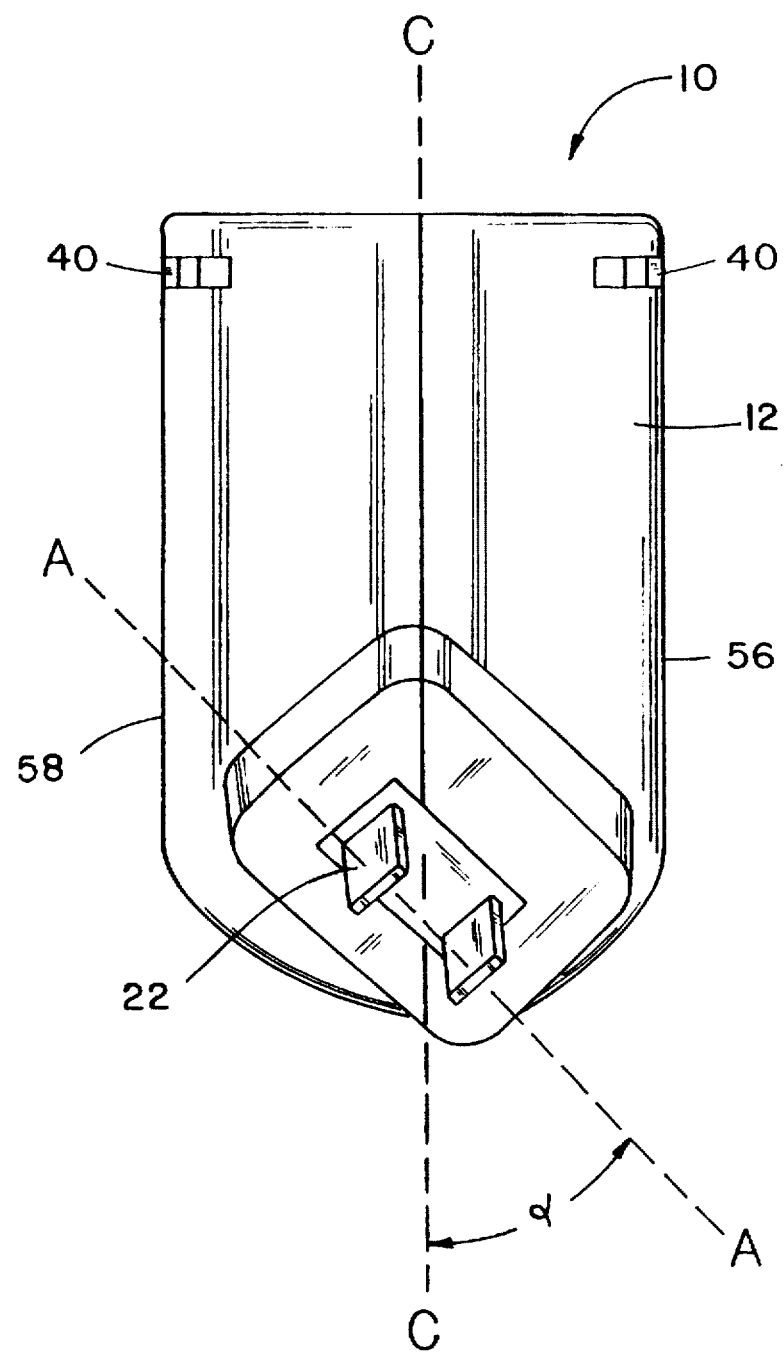
FIG. 2 is a front elevation view of the device of FIG. 1.

Turning now to the drawings, wherein like parts are indicated by like reference numbers, the preferred embodiment of the electrically activatable fumigating device of the invention is shown generally in FIGS. 1 and 2 at 10. The fumigating device 10 includes a body 12. The body 12 has a well 14, best shown in FIG. 3, having a longitudinal axis. The longitudinal axis of the well 14 is indicated in FIGS. 1 and 2 as the line C—C. The well 14 has a well mouth 16 that opens to the atmosphere at one end of the well's longitudinal axis.

Figure 3:
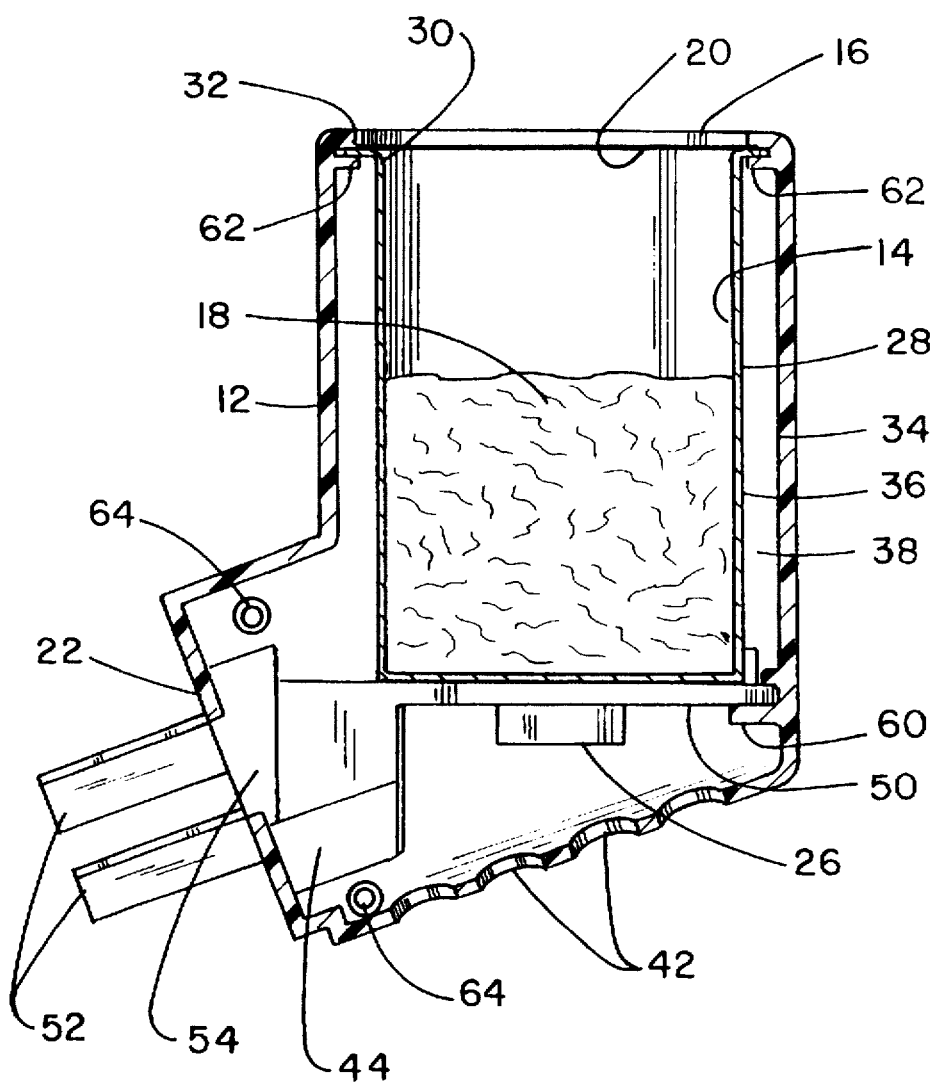
FIG. 3 is a crossectional view of the device of FIG. 1 taken along section lines 3—3 of FIG. 1, with the modular heater assembly shown whole.

The well 14 contains a heat-activatable chemical charge 18, shown in FIG. 3. The chemical charge 18 includes an active ingredient and blowing agent means for expelling the active ingredient from the well by a self-sustaining chemical reaction. The blowing agent may combust or, preferably, be a heat-activatable but non-combusting blowing agent, such as azodicarbonamide. The well mouth 16 is closed by a cover 20 preferably made of a material sufficiently impervious to water and atmospheric gases as to be able to protect the chemical charge 18 during storage. The cover 20 is openable by the blowing agent means to release fumigant at the well mouth 16. To accomplish this function, the cover 20 may be capable of bursting, melting, or otherwise releasing fumigant in response to the temperature or pressure generated by the blowing agent means.

The fumigating device 10 also includes an electrical plug 22. The electrical plug 22 is adapted to be plugged into a conventional electrical receptacle (not shown). The electrical plug 22 has a transverse axis that extends from side-to-side across the face of an electrical receptacle when the electrical plug is plugged thereinto. The transverse axis is indicated in FIG. 1 and 2 by line A—A. The electrical plug 22 is fixedly attached to the body 12, with the longitudinal axis C—C of the well 14 oriented at an angle of about 35° to about 55° to the transverse axis A—A of the electrical plug. This angle is indicated in FIG. 2 as angle α. By this orientation, the well mouth 16 may be directed sidewardly at that angle α with respect to any electrical receptacle into which the electrical plug 22 is plugged.

The fumigating device 10 further includes a heating means for heating the heat-activatable chemical charge 18 to activate the blowing agent means. The heating means is activatable by electricity delivered thereto via the electrical plug 22.

Preferably, the heating means is non-renewably self-disabling after heating sufficiently to initiate the action of the blowing agent means. By this means, use of the fumigating device subsequent to the activation of the blowing agent means is prevented.

Preferably, the heating means itself is destroyed non-renewably upon its first use, thus requiring that the fumigating device 10 be a single use device.

The heating means preferred is a resistance heater designed to break or otherwise become discontinuous after heating to a select temperature, thereby interrupting the flow of the electricity through the fumigating device 10. Various resistance heaters are known to those skilled in the art, including heaters utilizing a loop or a wound coil of resistance wire, such as the loop shown at 24 in FIG. 5, as is presently preferred. However, other resistance heaters also are within the breadth and scope of the invention, including foil heaters, resistive conductive patterns printed, etched, or otherwise formed on a supporting substrate, and the like.

Alternatively, the heating means may include a pyrotechnic heater ignitable by electricity provided via the electrical plug 22. Pyrotechnic heaters typically are entirely consumed when operated, being thus disabled for subsequent use. Another alternative heating means is a positive temperature co-efficient heater, commonly called a "PTC" heater. A positive temperature co-efficient heater may be made self-disabling by selecting its capacity to be such that it burns out when a desired temperature is reached or by other conventional means known to those skilled in the art.

In addition to or as an alternative to employing heaters that break or self-consume, it is possible to provide a conventional thermal cutoff selected to interrupt the flow of electricity through the fumigating device 10 when the thermal cutoff is heated above a selected maximum temperature. This optional means of disabling the heater when temperatures within the fumigating device 10 have risen above a selected maximum temperature is illustrated by the thermal cutoff shown at 26 in FIG. 3. A thermal cutoff may be used in addition to a heating means that is self-disabling by other means, as described above.

The electrical plug 22 has a longitudinal axis extending parallel to the direction of the insertion of the electrical plug into an electrical receptacle. This axis is indicated in FIG. 1 as the line B—B. Preferably, the longitudinal axis C—C of the well 14 is tipped away from the longitudinal axis of the electrical plug 22 at an angle thereto greater than 90° and less than 180°. That angle is identified as angle β in FIG. 1. By this arrangement, the well mouth 16 is directed away from any electrical receptacle into which the electrical plug 22 is plugged.

The angles α and β described above contribute both individually and in combination to the utility of the fumigating device 10 of the invention. The chemical charge 18 is designed to forcefully project fumigant from the well mouth 16 upon activation of the blowing agent means. The material projected from the well mouth 16 may be an entirely volatilized material, such as a scent or volatile insect control active ingredient, but more typically and preferably is a fumigant that includes a finely divided smoke that is intended to be blown throughout a room and then to settle out on the room's surfaces. In contrast to the dependence on the mere diffusion of a volatile active ingredient simply evaporated from the vapor-emanating tablet of Costello, U.S. Pat. No. 2,513,919, the fumigant of the invention is expelled by the forceful action of the blowing agent and therefore may but need not be an entirely evaporatable volatile substance. Consequently, for optimal results, when a fumigating device 10 is plugged into a wall electrical receptacle for use, the well mouth 16 must at least be oriented generally upwardly. It will be apparent that, because of the angle α between the transverse axis of the electrical plug 22 and the longitudinal axis of the well 14, the fumigating device 10 may be plugged into a wall-mounted electrical receptacle with the well mouth 16 presented upwardly at an angle not less than either α or 90° minus α, depending on the vertical or horizontal orientation of the receptacle.

As is described above, it also is preferred that the longitudinal axis C—C of the well 14 be tipped away from the longitudinal axis B—B of the electrical plug 22 at an angle β thereto greater than 90° and less than 180°. By this arrangement, when the fumigation device 10 is plugged into a wall-mounted electrical receptacle, the well mouth 16 is presented both upwardly, as has just been discussed, and also outwardly, away from the wall. Such a presentation has two advantages. It reduces the exposure of the wall above the receptacle to directly projected fumigant, and it is more likely to direct fumigant toward the center of the space to be treated, resulting in a more uniform distribution throughout that space of fumigant and especially of fumigating smoke. If the fumigating device 10 is being used with an upwardly facing receptacle mounted in a counter top or comparable surface, this tipping of the longitudinal axis of the well 14 away from the longitudinal axis of the electrical plug 22 still directs the well mouth 16 upwardly, away from the counter top. By the described angular orientation of parts of the device 10, the device is made useful in a wide variety of circumstances, all without the need for moving parts.

The chemical charge 18 may be conveniently contained within a canister such as that shown at 28 of FIG. 3. Preferably, the canister 28 is a seamless, metallic can. The canister 28 has a canister open end 30 that may be closable by the cover 20. The canister 28 may be held entirely within the body 12, as is preferred and is shown in FIG. 3, or it may project outwardly from the body at the well mouth 16. In the preferred embodiment, the canister 28 includes an outwardly extending radial flange 32 located at the canister open end 30. Portions of the body 12 may then conveniently extend over the radial flange 32 to secure the canister 28 within the well 14. By this or similar means, the canister 28 may be so permanently affixed within the well 14 that a spent canister cannot be removed and replaced without the effective destruction of the fumigating device 10, thus insuring that the fumigating device can only be used once.

When the fumigating device 10 is operated, heat is generated both from operation of the heating means and also by the reaction of blowing agent means. Consequently, the body 12 must be capable of withstanding that heat and retaining its structural integrity. Therefore, it is preferred that the body 12 include a body outer shell 34 and that the well 14 include a well wall 36 spaced from the outer shell to define between them an insulating air space 38, as is shown in FIG. 3. In FIG. 3, the well wall 36 is defined by the sides of the canister 28, as is preferred. The air space 38 provides thermal insulation for the body outer shell 34, thus reducing the intensity of heat experienced by the outer shell when the heating means and blowing agent means are activated.

If it is desired to further reduce the intensity of heat experienced by the outer shell 34, at least one heat vent 40, shown in FIG. 1, may be formed in the body outer shell 34, the heat vent communicating between the insulating air space 38 and the surrounding atmosphere to exhaust heated air from the insulating air space. The body outer shell 34 may also include bottom vents 42, best seen in FIG. 3, communicating between the insulating air space 38 and the surrounding atmosphere and located at a point on the body outer shell 34 lower than the location of heat vents 40. The heat vents 40 and bottom vents 42 provide a path for convective air currents to pass upwardly through the insulating air space 38.

Figure 6:
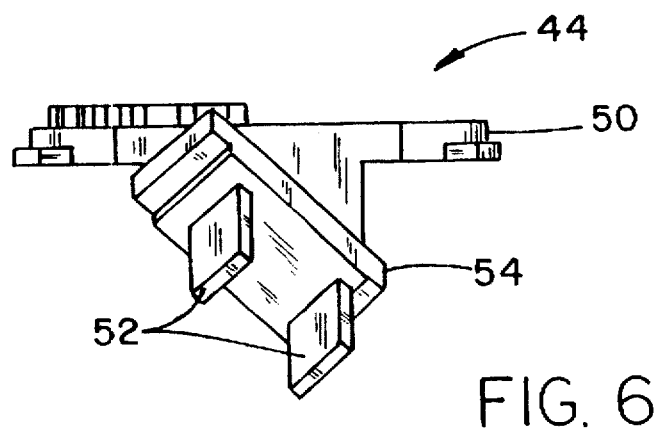
FIG. 6 is a front elevation view of the modular heater assembly of FIG. 5.
Figure 7:
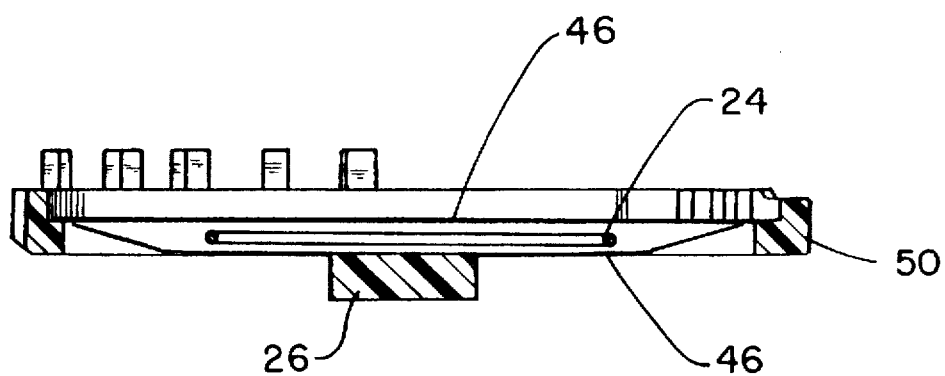
FIG. 7 is a crossectional view of the modular heater of FIG. 5 taken along section lines 7—7 of FIG. 5.

The fumigating device 10 of the invention may be manufactured by many of the conventional ways known to the art by which small, electrically activated devices are made. Thus, the body 12 may be unitarily molded of heat-resistant plastic or ceramic material into which the other elements of the fumigating device are directly imbedded. Alternatively and preferably, the fumigating device 10 may incorporate a modular heater assembly 44, shown separately in FIGS. 5, 6, and 7 and shown in place within the device 10 in FIGS. 3 and 4. The modular heater assembly 44 may be manufactured separately from the body 12 of the fumigating device 10 and be combined, as a pre-assembled sub-unit, with the other parts of the fumigating device 10 to produce the device in its completed form, with the modular heater assembly being rigidly held within the body 12.

The modular heater assembly 44 includes a heater platform that supports the heating means. The heater platform extends under the well 14, generally at a right angle to the longitudinal axis thereof. Although various designs of such a heater platform will be apparent to one skilled in the art and are within the breadth and scope of the invention, a preferred embodiment of the heater platform is shown in the figures at 50 and is described, below.

Figure 5:
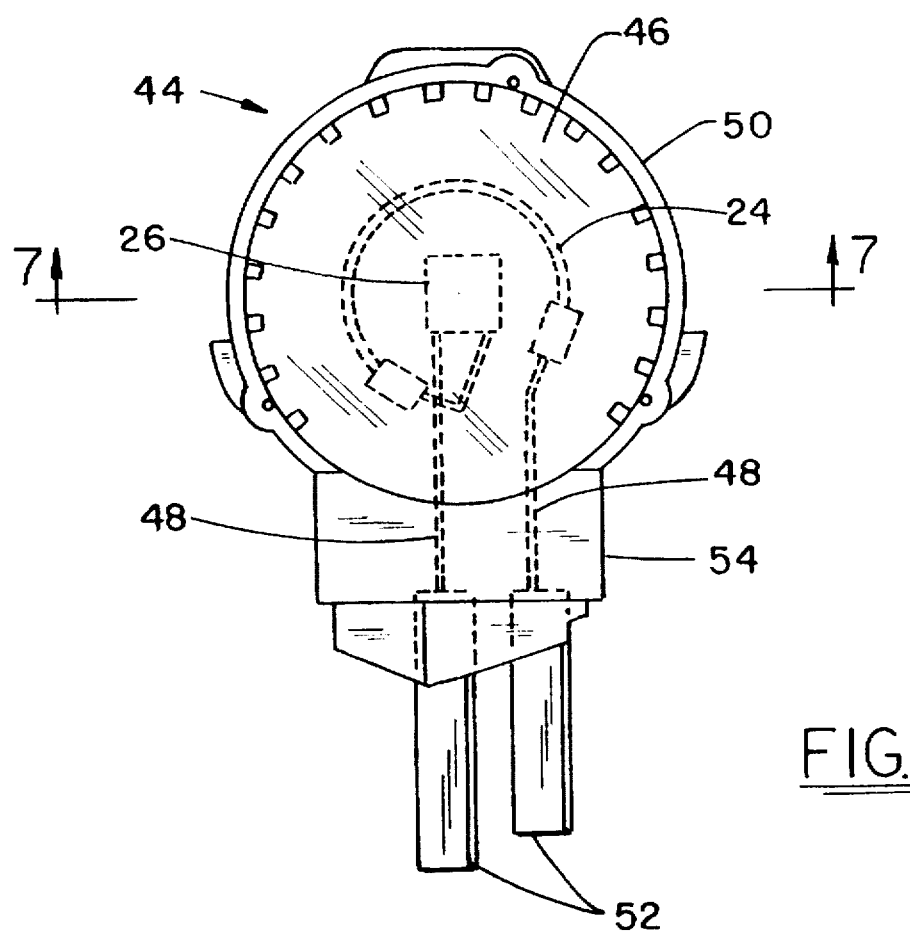
FIG. 5 is a top plan view of the modular heater assembly of the electric fumigating device of the invention, with a loop resistive wire heater, thermal cutoff, and electrical leads shown in phantom.

Preferably, the modular heater assembly 44 includes a pair of electrically non-conductive plates 46. The plates 46 extend parallel to each other and confine the heating means sandwiched between the plates, as is easily visualized in FIG. 7. Electrical leads 48, shown in FIG. 5, are connected to the heating means and extend beyond the margin of the plates 46. A heater platform 50 is circumferentially formed around the margins of the plates 46, with the leads 48 extending therethrough. Preferably, the modular heater assembly 44 includes blades 52 that are in electrical communication with the electrical leads 48, the blades 52 being fixed within a plug body 54 that is formed unitarily with the heater platform 50. Thus, all of the electrical parts of the fumigating device 10 are assembled as parts of the separately-manufactured modular heater assembly 44.

The preferred heating means of the modular heater assembly 44 is a resistive wire heater, such as the loop 24 of resistive wire shown in phantom in FIG. 5. A thermal cutoff may also be conveniently assembled as part of the modular heater assembly 44, as is shown in phantom at 26 in FIG. 5. An alternative and preferred location for the thermal cutoff is within a pocket (not shown) formed within the plug body 54.

Depending upon the needs of the particular device into which a modular heater assembly 44 is incorporated, it may be important to adjust the relative amounts of heat being given off from each of the two non-conductive plates. The thermal insulating characteristics of the non-conductive plates 46 may be selected to release heat through the non-conductive plates in the relative amounts desired. For example, a first one of the non-conductive plates 46 may be less thermally insulating than the other non-conductive plate, whereupon the heat from the heater assembly 44 will be preferentially released or directed through the first non-conductive plate.

It is also possible to include an additional heat-responsive material (not shown) held by any convenient means within the body 12 beneath the heater platform. In the preferred embodiment, the additional heat-responsive material may be held beneath the non-conductive plate 46 furthest from the well 14. Typically the temperature beneath the heater platform remains cooler than the temperature to which the components of the chemical charge 18 are subjected, even without the use of non-conductive plates 46 of differing thermal insulating characteristics. A heat-responsive material, such as a fragrance, for example, that may be unable to withstand the high temperatures of the chemical charge without deterioration, may be placed at such a location and be vented through openings such as the bottom vents 42.

Figure 4:
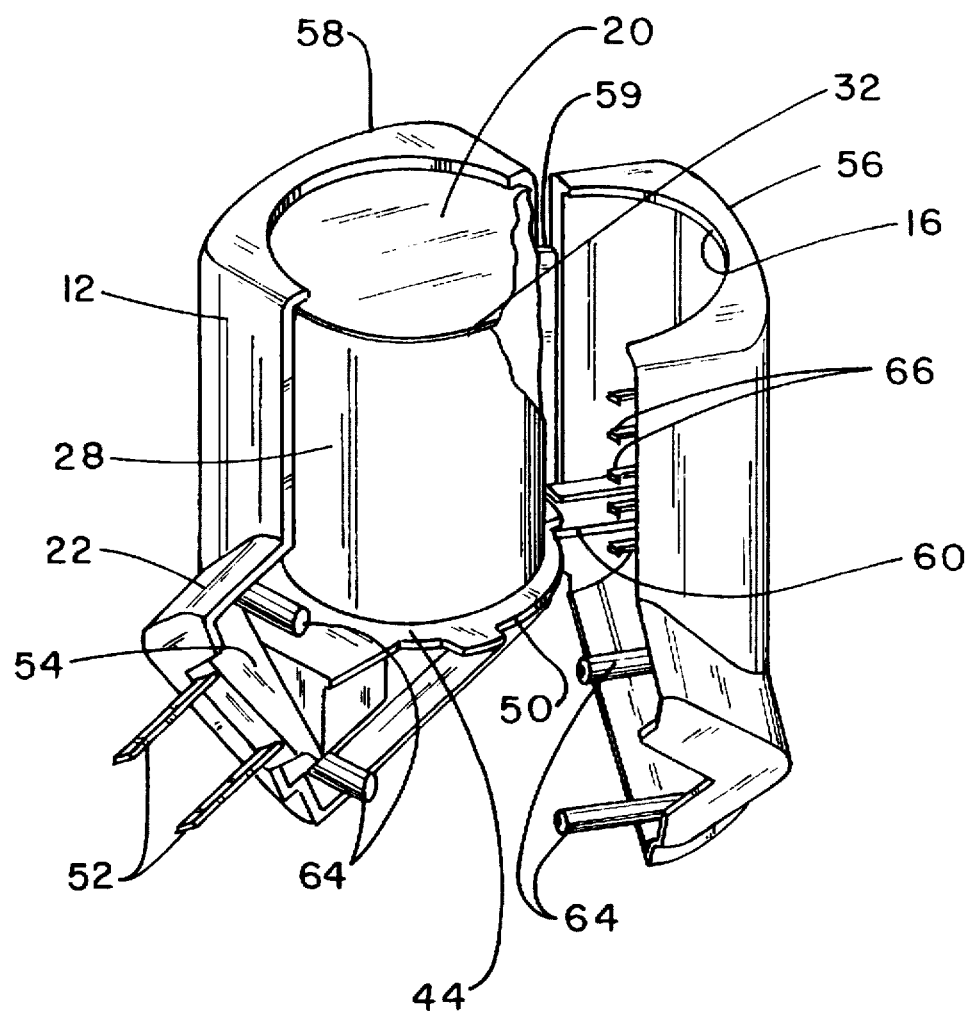
FIG. 4 is a front perspective view of the device of FIG. 1, with the housing of the device shown in an open position typical of the preferred process of assembly of the device and a portion of the canister broken away to show the living hinge.

The device 10 may be conveniently made by separately manufacturing the modular heater assembly 44, body 12, and canister 28, the canister being filled to an appropriate level with the chemical charge 18, with the canister open end 30 being closed by the well mouth cover 20. The body 12 may be molded as two, generally mirror-image, first and second body halves 56, 58, the halves being either made entirely separate from each other or joined by a living hinge, indicated in FIG. 4 at 59. A portion of the canister 28, as shown in FIG. 4, has been broken away to allow the living hinge 59 to be seen. Use of the living hinge 59 facilitates manufacture in that it pre-aligns the body halves 56, 58 for assembly. The body halves 56, 58, are designed to close around, receive, and firmly hold the modular heater assembly 44 with its plug body 54.

The first and second body halves 56, 58, include inwardly extending structures defining a support shelf 60, shown in FIG. 4, adapted to hold and support the modular heater assembly 44. An inwardly extending canister support 62, shown in FIG. 3, is located at the well mouth 16 of the body 12 and is adapted to receive and hold the radial flange 32 of the canister 28 when the body halves 56, 58, are closed to form the body 12, locating the canister directly over the heating means of the modular heater assembly 44, preferably with the canister actually resting on the heater platform 50, which may have surfaces designed to be presented toward and to receive and properly locate the canister thereon. The body halves 56, 58 may also include mating male and female locator pins 64, which aid in aligning the body halves as they are closed, and snap-fitting locking hooks 66 that engage locking ledges (not shown) to hold the body halves together when they have been closed over the modular heater assembly and the canister, to assemble a completed fumigating device 10. Alternative alignment and fastening means will be apparent to one skilled in the art and are within the scope and breadth of the invention.

The use of the modular heater assembly 44 of the invention achieves important advantages. Heat-resistant plastics tend to be relatively expensive. The heater platform 50 typically will experience higher temperatures than will the body 12, especially if the air space 38 is used, as is preferred. Consequently, expensive plastics may be needed for making the heater platform 50. But by employing a modular heater assembly 44 manufactured separately from the body 12, a maker of the device of the invention may manufacture the body 12 as a separate molding, using less expensive plastics with lower thermal properties. If non-conductive plates 46 are used, they may be conveniently made of mica or other, similarly inexpensive materials. By use of the non-conductive plates 46, only so much expensive plastic is necessary as is required to surround and seal the margins of the plates.

It also may be unnecessary to manufacture the body 12 to size or other tolerances as demanding as those useful for the modular heater assembly 44. Thus, while excessive heating is to be avoided, for the reliable activation of the blowing agent means, it is necessary that the heating means reach an exactingly consistent minimum temperature level before breaking, burn-out, or other self-disabling occurs. This may require meeting correspondingly exacting manufacturing tolerances unnecessary for the body 12. By allowing for separate manufacture, this difference becomes possible and may also lead to manufacturing savings. Furthermore, it may be advantageous to manufacture the body 12 and the modular heater assembly 44 in different factories or at different times. Thus, the use of the modular heater assembly 44, together with its specific design, functions in several ways to lower manufacturing costs.

For various reasons, it is important that the fumigating device 10 be so designed as to allow it to be manufactured at a cost sufficiently low that it is practical to use it as a single-use, throw-away device. For example, it is both convenient and may be functionally advantageous for users to be able to affordably buy as many fumigating devices 10 as may be necessary to simultaneously fumigate all of the rooms of an apartment or house. Typically, an entire house or apartment should be vacated when one more rooms are being fumigated. Simultaneous fumigating allows an occupant to vacate the premises only once instead of repeatedly, as may be necessary if multiple rooms are treated in succession. Granted, it may be practical for a professional insect control operator to own several, expensive fumigating devices designed to be repeatedly recharged and used, anticipating the need to fumigate many houses over a period of time. But, in contrast, a person fumigating his or her own home typically will not need to do so repeatedly, making impractical an investment in many, expensive fumigators that will be used only occasionally and then must be stored for long periods of time.

Furthermore, insect control fumigating devices are typically charged with insecticides and other materials that either in fact should be handled with care or that at least are distasteful to handle. A professional insect control operator may well have the skill and experience that allows for the safe extraction and disposal of discharged insecticide canisters or the like. However, it is much more convenient for the occasional user of a fumigating device to be able to unplug and dispose of the entire device, without the need to handle spent, insecticide-tainted canisters. It is also better if an occasional user of a fumigating device can avoid having to store the device between uses, if traces of insecticide may remain on it.

Thus, it is clear that, for fumigating devices, a design that allows for very inexpensive manufacture provides something more important than mere manufacturing economy, albeit manufacturing economy itself is always an important issue for consumer products. But in this instance, the single-use disposability of a fumigating device allows it to be employed in a different, useful manner by an identifiable class of users, resulting in a level of convenience and effectiveness that cannot be obtained in a practical manner with more expensive, multiple-use devices.

The method of the invention of fumigating with an fumigating active ingredient an area in which an electrical receptacle is mounted in a generally vertical surface includes first providing an electrically activatable fumigating device 10, as described above, having a body having a well with a well mouth that opens to the atmosphere at one end of the well's longitudinal axis and containing a heat-activatable chemical charge including the active ingredient and blowing agent means for expelling the active ingredient from the well by a self-sustaining chemical reaction, the well mouth being closed by a cover openable by the blowing agent means to release fumigant at the well mouth. The device so provided includes an electrical plug adapted to be plugged into an electrical receptacle and having a transverse axis that extends from side-to-side across the face of an electrical receptacle when the electrical plug is plugged thereinto, the electrical plug being fixedly attached to the body with the longitudinal axis of the well oriented at an angle of about 35° to about 55° to the transverse axis of the electrical plug to direct the mouth of the well sidewardly at that angle with respect to any electrical receptacle into which the electrical plug is plugged. The device further includes a single use heating means for heating the heat-activatable chemical charge to initiate the action of the blowing agent means, the heating means being activatable by electricity delivered via the electrical plug.

The method further includes plugging the fumigating device into the electrical receptacle, so selecting the orientation of the fumigating device that the well mouth opens generally upwardly, and then allowing electricity from the electrical receptacle to activate the heating means, first to initiate the action of the blowing agent means to release the active ingredient at the well mouth and second to non-renewably self-disable the fumigating device, preventing its subsequent use.

Preferably the electrical plug of the fumigating device so provided has a longitudinal axis parallel to the direction of its insertion into an electrical receptacle, and the longitudinal axis of the well is tipped away from the longitudinal axis of the electrical plug at an angle thereto greater than 90° and less than 180°, whereby the well mouth is directed at that angle away from the electrical receptacle into which the electrical plug is plugged. By this method, when the blowing agent means is activated by the heating means so that the fumigant is projected forcefully from the well mouth, the fumigant is directed both generally upwardly and away from the wall in which the electrical receptacle is mounted. Thus the wall is preserved from the direct impact of the fumigant and the active ingredient is better distributed throughout the space to be fumigated.

Industrial Applicability

The industrial application of the invention is apparent in that it includes a fumigating device and method for fumigating a room or other space with a fumigant, such as insecticide smoke or the like, and also includes a modular heating assembly for the practical and economical manufacture of such devices.

While preferred forms of the invention have been shown in the drawings and have been described above, variations will be apparent to those skilled in the art. Furthermore, although the drawings show an electrical plug with blades appropriate for conventional North American electrical receptacles, other blades and connectors appropriate for various receptacles of different design are possible and are a part of and within the scope and breadth of the invention. Consequently, the invention should not be construed as limited to the specific forms shown and described. Instead, the invention should be understood in terms of the following claims.

We claim:

1. An electrically activatable fumigating device for use with electrical receptacles conventionally mounted in generally vertical or upwardly facing surfaces, the fumigating device comprising:
- a. a body, the body having a well with a well mouth that opens to the atmosphere at one end of the well's longitudinal axis and contains a heat-activatable chemical charge including an active ingredient and blowing agent means for expelling the active ingredient from the well by a self-sustaining chemical reaction, the well mouth being closed by a cover that is openable by the blowing agent means to release fumigant at the well mouth;
- b. an electrical plug having a transverse axis that extends from side-to-side across the face of an electrical receptacle when the electrical plug is plugged thereinto, the electrical plug being fixedly attached to the body with the longitudinal axis of the well oriented at an angle of about 35° to about 55° to the transverse axis of the electrical plug to direct the mouth of the well sidewardly at that angle with respect to any electrical receptacle into which the electrical plug is plugged; and
- c. a heating means for heating the heat-activatable chemical charge to initiate the action of the blowing agent means, the heating means being activatable by electricity delivered via the electrical plug.

2. The fumigating device of claim 1 wherein the heating means is non-renewably self-disabling after heating sufficiently to initiate the action of the blowing agent means, thereby preventing subsequent use of the fumigating device.

3. The fumigating device of claim 2 wherein the heating means is nonrenewable, thus requiring that the fumigating device be a single use device.

4. The fumigating device of claim 2 wherein the heating means is a resistance heater designed to break after heating to a selected temperature to interrupt the flow of electricity through the fumigating device.

5. The fumigating device of claim 4 wherein the resistance heater is a resistive wire heater.

6. The fumigating device of claim 4 wherein the resistance heater is a conductive pattern formed on a supporting substrate.

7. The fumigating device of claim 4 wherein the resistance heater is a foil heater.

8. The fumigating device of claim 2 wherein the heating means is a pyrotechnic heater.

9. The fumigating device of claim 2 wherein the heating means is a positive temperature coefficient heater.

10. The fumigating device of claim 1 wherein the heating means includes a thermal cut-off selected to interrupt the flow of electricity through the device when the thermal cut-off is heated above a selected maximum temperature.

11. The fumigating device of claim 1 wherein the electrical plug has a longitudinal axis parallel to the direction of its insertion into an electrical receptacle, and the longitudinal axis of the well is tipped away from the longitudinal axis of the electrical plug at an angle thereto greater than 90° and less than 180°, whereby the well mouth is directed at that angle away from any electrical receptacle into which the electrical plug is plugged.

12. The fumigating device of claim 1 including a modular heater assembly formed separately from the body, the modular heater assembly including a heater platform supporting the heating means.

13. The fumigating device of claim 12 wherein the heater platform extends under the well and generally at a right angle to the longitudinal axis thereof, the fumigating device including a heat-responsive material located within the body beneath the heater platform and the heating means, the body including vents through which the heat-responsive material may escape when heated.

14. The fumigating device of claim 12 wherein the modular heater assembly further includes the electrical plug, the electrical plug having a plug body and plug blades fastened in place within the plug body, the plug body and the heater platform being unitarily formed.

15. The fumigating device of claim 1 including a canister held within the well of the body, the canister containing the heat-activatable chemical charge and having an open end closed by a cover openable by the blowing agent means to release fumigant at the well mouth.

16. The fumigating device of claim 15 wherein the canister is so permanently affixed within the well that removal of a spent canister destroys the fumigating device, thus ensuring that the fumigating device can only be used once.

17. The fumigating device of claim 1 wherein the body includes an outer shell and the well includes a well wall spaced from the outer shell to define between them an insulating air space, to reduce the intensity of heat experienced by the outer shell when the blowing agent means is activated.

18. The fumigating device of claim 17 wherein the body includes at least one heat vent communicating between the insulating air space and the atmosphere to exhaust heated air from the insulating air space.

19. An electrically activatable fumigating device for use with electrical receptacles conventionally mounted in generally vertical or upwardly facing surfaces, the fumigating device comprising:
- a. a body, the body having a well with a well mouth that opens to the atmosphere at one end of the well's longitudinal axis and that contains a heat-activatable chemical charge including an active ingredient and blowing agent means for expelling the active ingredient from the well by a self-sustaining chemical reaction, the well mouth being closed by a cover openable by the blowing agent means to release fumigant at the well mouth;
- b. an electrical plug having a transverse axis that extends from side-to-side across the face of an electrical receptacle when the electrical plug is plugged thereinto; and the longitudinal axis of the well is oriented at an angle of about 35° to about 55° to the transverse axis of the electrical plug to direct the mouth of the well sidewardly at that angle with respect to any electrical receptacle into which the electrical plug is plugged; and
- c. a modular heater assembly formed separately from the body but mounted within the body in fixed relation thereto, the modular heater assembly including a heater platform supporting a heating means electrically activatable by electricity that is delivered via the electrical plug from an electrical receptacle when the electrical plug is plugged thereinto.

20. The fumigating device of claim 19 wherein the heating means is a non-renewable resistance heater designed to break after heating to a selected temperature, whereby subsequent reuse of the fumigating device is prevented.

21. The fumigating device of claim 20 wherein the resistance heater is a resistive wire heater.

22. The fumigating device of claim 20 wherein the resistance heater is a conductive pattern formed on a supporting substrate.

23. The fumigating device of claim 20 wherein the resistance heater is a foil heater.

24. The fumigating device of claim 19 wherein the heating means is a pyrotechnic heater.

25. The fumigating device of claim 19 wherein the heating means is a positive temperature coefficient heater.

26. The fumigating device of claim 19 wherein the modular heater assembly further includes the electrical plug, the electrical plug having a plug body and plug blades fastened in place within the plug body, the plug body and the heater platform being unitarily formed.

27. The fumigating device of claim 19 wherein the heating means includes a thermal cut-off selected to interrupt the flow of electricity through the device when the thermal cut-off is heated above a selected maximum temperature.

28. The fumigating device of claim 19 wherein the electrical plug has a longitudinal axis parallel to the direction of its insertion into an electrical receptacle, and the longitudinal axis of the well is tipped away from the longitudinal axis of the electrical plug at an angle thereto greater than 90° and less than 180°, whereby the well mouth is directed at that angle away from any electrical receptacle into which the electrical plug is plugged.

29. The fumigating device of claim 19 including a canister held within the well of the body, the canister containing the heat-activatable chemical charge and having an open end closed by a cover openable by the blowing agent means to release fumigant at the well mouth.

30. The fumigating device of claim 29 wherein the canister is permanently affixed within the well.

31. The fumigating device of claim 29 wherein the body includes molded first and second body halves joined by a living hinge, the body halves having an open position when first molded and being closable over the canister and modular heater assembly during manufacture of the fumigating device to form the body, the relative position of the body halves being maintained during manufacture by the living hinge.

32. A method of fumigating an area in which an electrical receptacle is mounted in a generally vertical surface with an fumigating active ingredient, the method comprising the steps of:

a. providing an electrically activatable fumigating device, the fumigating device having:

i. a body having a well with a well mouth that opens to the atmosphere at one end of the well's longitudinal axis and contains a heat-activatable chemical charge including the active ingredient and blowing agent means for expelling the active ingredient from the well by a self-sustaining chemical reaction, the well mouth being closed by a cover openable by the blowing agent means to release fumigant at the well mouth;

ii. an electrical plug having a transverse axis that extends from side-to-side across the face of an electrical receptacle when the electrical plug is plugged thereinto, the electrical plug being fixedly attached to the body with the longitudinal axis of the well oriented at an angle of about 35° to about 550° to the transverse axis of the electrical plug to direct the mouth of the well sidewardly at that angle with respect to any electrical receptacle into which the electrical plug is plugged; and iii. a single use heating means for heating the heat-activatable chemical charge to initiate the action of the blowing agent means, the heating means being activatable by electricity delivered via the electrical plug;

b. plugging the fumigating device into the electrical receptacle, so selecting the orientation of the fumigating device that the well mouth opens generally upwardly; and c. allowing electricity from the electrical receptacle to activate the heating means, first to initiate the action of the blowing agent means to release the active ingredient at the well mouth and second to non-renewably self-disable the fumigating device, preventing its subsequent use.

33. The method of claim 32 wherein the electrical plug of the fumigating device has a longitudinal axis parallel to the direction of its insertion into an electrical receptacle, and the longitudinal axis of the well is tipped away from the longitudinal axis of the electrical plug at an angle thereto greater than 90° and less than 180°, whereby the well mouth is directed away from the electrical receptacle into which the electrical plug is plugged.

\* \* \* \* \*

UNITED STATES PATENT AND TRADEMARK OFFICE
CERTIFICATE OF CORRECTION

Patent No.   : 5,796,914
Dated        : Aug. 18, 1998
Inventors    : John J. Gatzemeyer et al.

It is certified that errors appear in the above-identified patent and that said Letters Patent is hereby corrected as shown below:

In the Detailed Description
of the Preferred Embodiment:

Column 5, line 31, delete "bums out" and substitute --burns out--.

Column 9, line 25, delete "one more" and substitute --one or more--.

In the Claims:

Claim 32, line 21, delete "550°" and substitute --55°--.

Signed and Sealed this

Seventeenth Day of April, 2001

Attest:

NICHOLAS P. GODICI

Attesting Officer   Acting Director of the United States Patent and Trademark Office